(12) United States Patent
Siuda et al.

(10) Patent No.: US 11,872,166 B2
(45) Date of Patent: Jan. 16, 2024

(54) HEIGHT ADJUSTABLE ARMREST OF A MEDICAL CHAIR

(71) Applicant: LINET spol. s r.o., Slany (CZ)

(72) Inventors: Bronislav Siuda, Trinec (CZ); Petr Mil, Baska (CZ)

(73) Assignee: Linet spol. s r.o., Slany (CZ)

( * ) Notice: Subject to any disclaimer, the term of this patent is extended or adjusted under 35 U.S.C. 154(b) by 320 days.

(21) Appl. No.: 17/424,602

(22) PCT Filed: Jan. 20, 2020

(86) PCT No.: PCT/CZ2020/000003
§ 371 (c)(1),
(2) Date: Jul. 21, 2021

(87) PCT Pub. No.: WO2020/151773
PCT Pub. Date: Jul. 30, 2020

(65) Prior Publication Data
US 2022/0079829 A1 Mar. 17, 2022

(30) Foreign Application Priority Data
Jan. 21, 2020 (CZ) .................. CZ2019-32

(51) Int. Cl.
*A47C 7/54* (2006.01)
*A61G 15/02* (2006.01)
(Continued)

(52) U.S. Cl.
CPC ............. *A61G 15/02* (2013.01); *A61G 15/12* (2013.01); *A47C 7/543* (2013.01); *B60N 2/753* (2018.02); *B60N 2/767* (2018.02)

(58) Field of Classification Search
CPC ........ A61G 15/21; A47C 7/543; B60N 2/753; B60N 2/767
See application file for complete search history.

(56) References Cited

U.S. PATENT DOCUMENTS 3,116,093 A 12/1963 Bosack
6,203,101 B1 * 3/2001 Chou ................... A47C 7/543
297/411.32
(Continued)

FOREIGN PATENT DOCUMENTS

EP 2888974 B1 10/2016
JP 3613056 B2 1/2005

OTHER PUBLICATIONS

European Patent Office, International Search Report, in PCT/CZ2020/000003, filed Jan. 20, 2020, dated Apr. 20, 2020.
(Continued)

*Primary Examiner* — Syed A Islam
(74) *Attorney, Agent, or Firm* — Thedford I. Hitaffer; Hitaffer & Hitaffer, PLLC (57) ABSTRACT

A medical chair with height adjustable armrest comprises a lifting mechanism, a base coupled to a bottom side of the lifting mechanism, a sitting part coupled to an upper side of the lifting mechanism, and a backrest part coupled rotatably to the upper side of the lifting mechanism. An armrest comprises an armrest stop with the armrest rotatably coupled to the backrest part adjustable to an upper position and a bottom position, where, in the bottom position, the armrest stop bears on the first stop coupled to the backrest part, and in the upper position, the armrest stop does not bear on the first stop. A latch system movably attached to the backrest part comprises a latch with back surface and a second stop where the latch system is adjustable into a first position of the latch mechanism and into a second position of the latch system where in the first position of the latch system, the latch is located between the first stop and the armrest stop and in the second position of the latch system, the latch is not located between the first stop and the armrest stop, and where an upper position of the armrest is a position where the armrest stop bears on the second stop or any other (Continued)

position where the armrest is higher than in case when the armrest stop bears on the second stop.

7 Claims, 6 Drawing Sheets

(51) Int. Cl.
*A61G 15/12* (2006.01)
*B60N 2/75* (2018.01)

(56) References Cited

U.S. PATENT DOCUMENTS

| | | |
|---|---|---|
| 6,715,836 B1 | 4/2004 | Chen et al. |
| 2017/0065083 A1 | 3/2017 | Baker et al. |

OTHER PUBLICATIONS

European Patent Office, Written Opinion, in PCT/CZ2020/000003, filed Jan. 20, 2020, dated Apr. 20, 2020.

\* cited by examiner

Fig. 6

HEIGHT ADJUSTABLE ARMREST OF A MEDICAL CHAIR

CROSS-REFERENCE TO RELATED APPLICATIONS

This application, filed under 35 USC 371, is a United States National Stage Application of International Application No. PCT/CZ2020/000003, filed Jan. 20, 2020, which claims priority to CZ Application No. PV 2019-32, filed on Jan. 21, 2019, the disclosures of which are incorporated herein by reference.

TECHNICAL FIELD OF THE INVENTION

The invention relates to medical chair area, and particularly, to a height adjustment of a medical chair armrests.

BACKGROUND OF THE INVENTION

At present time, more and more patients consider some factors previously neglected as very important. These factors include, for example, comfort, easiness or therapeutic impact of the surrounding environment and also medical devices. Comfort of patients can be optimized by a height adjustable armrest of a medical chair. Fast and prompt adjusting of such armrest of the medical chair may minimize stress load of a patient, which is usually present during preparation for medical acts.

Japanese patent JP3613056 describes one of the options of present solutions for height adjustable armrests of medical chairs, wherein the height of the armrest is adjusted by a screw upon which an armrest stop bears.

Another known solution described in European patent EP2888974 consists of using two adjusting screws by which the armrest position is set to a required level. One of the adjusting screws is tightened and the other one is loosened when providing adjustment.

Disadvantages of the above-mentioned solutions for height adjustment of armrests are particularly insufficient simplicity and insufficient promptness to change the adjustment of the armrest. Height adjustment cannot be provided also without any accessory tool necessary to control the screw, which may potentially increase discomfort due to lack of space needed for working with such accessory tool.

The above stated reasons result in the fact that development of an easier and faster embodiment of height adjustment of armrests of medical chairs is desired and advisable.

SUMMARY OF THE INVENTION

The above-mentioned issues are solved by a medical chair with a height adjustable armrest comprised of a lifting mechanism and a base fixed to a bottom side of a lifting mechanism, a sitting part fixed to an upper side of the lifting mechanism and a backrest part fixed rotatably to the upper side of the lifting mechanism. An armrest comprises an armrest stop, wherein the armrest is rotatably fixed to the backrest part so that the armrest can be adjusted into an upper position and into a bottom position. In the bottom position, the armrest stop bears on a first stop fixed to the backrest part and in the upper position, the armrest stop does not bear on this first stop. A principal aspect of the invention comprises a latch system movably coupled to the backrest part and configured to receive a latch, which includes a back surface and a second stop. The latch system can be adjusted into a first position of the latch system and into a second position of the latch system. In the first position of the latch system, the latch is between the first stop and the armrest stop, in the second position of the latch system, the latch is not between the first stop and the armrest stop. The upper position of the armrest is thus a position when the armrest stop bears on the second stop or any other position when the armrest is higher than in case when the armrest stop bears on the second stop.

The advantage of the invention is particularly an easy and simple structure and handling. The height of the armrests can be adjusted without necessity to use any other accessory tool and the individual adjustments are done quickly and fast.

In the preferred embodiment, the latch bears with a back side on the first stop in the first position. The advantage of this embodiment is higher stability of the armrests.

In the preferred embodiment, the latch has a shape of a wedge tapering toward the center of rotation of the armrest, which provides easier manipulation with mechanism.

In the preferred embodiment, the medical chair also comprises an arm and a coupler where the arm is fixed to the first stop and the first stop and the arm are fixed to the backrest part rotatably, whereby the coupler is fixed rotatably by a first end of the coupler to the arm and fixed rotatably by a second end of the coupler to the sitting part. This embodiment is advantageous as the position of the first stop can change in dependence on the position of the backrest part toward the sitting part.

In the preferred embodiment, the latch system comprises a handle with a handrail which is rotatably fixed to the backrest part. The advantage is that the handle with the handrail makes adjustment of the latch system easier.

In the preferred embodiment, the latch system includes a surface comprising a projection and a handle of a locking mechanism comprising a hollow, whereby the projection and the hollow fit together at least in one of the first position of the latch system or the second position of the latch system. The advantage is in the fact that the armrest can be locked in the required position and adjustment of the position is faster and more accurate.

In another embodiment, the latch system includes a surface comprising a hole and a handle of a locking mechanism comprising a projection, whereby the projection and the hole fit together at least in one of the first position of the latch system or the second position of the latch system. The advantage is in the fact that the armrest can be locked in the required position and adjustment of the position is faster and more accurate.

BRIEF DESCRIPTION OF THE DRAWINGS

The essence of the invention is further clarified by examples of embodiments which are described by using the attached drawings.

DETAILED DESCRIPTION OF THE DRAWINGS

Figure 1:
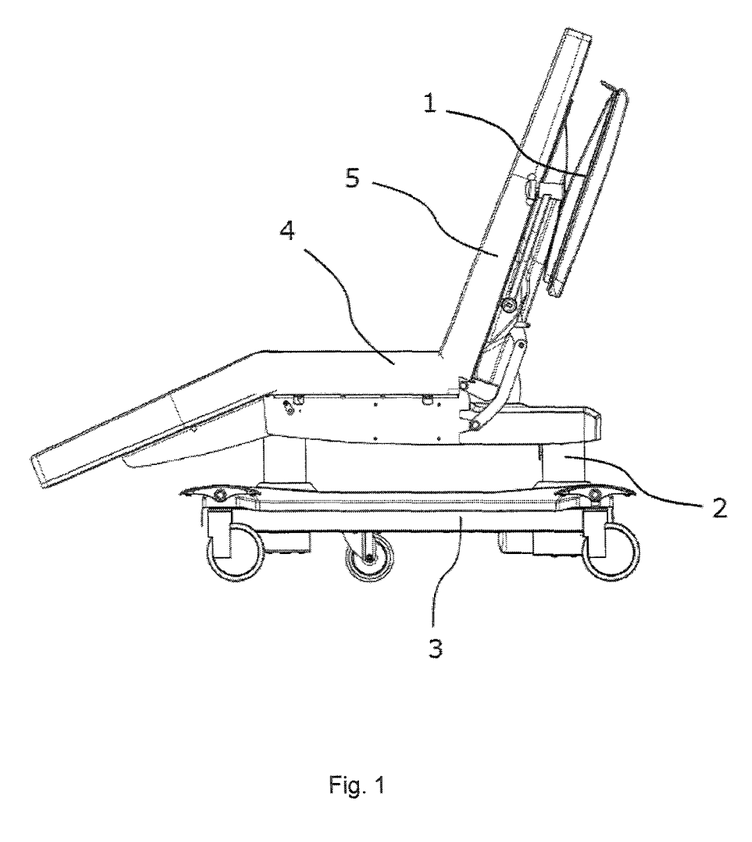
FIG. 1 shows schematically the chair with the armrest raised.
Figure 2:
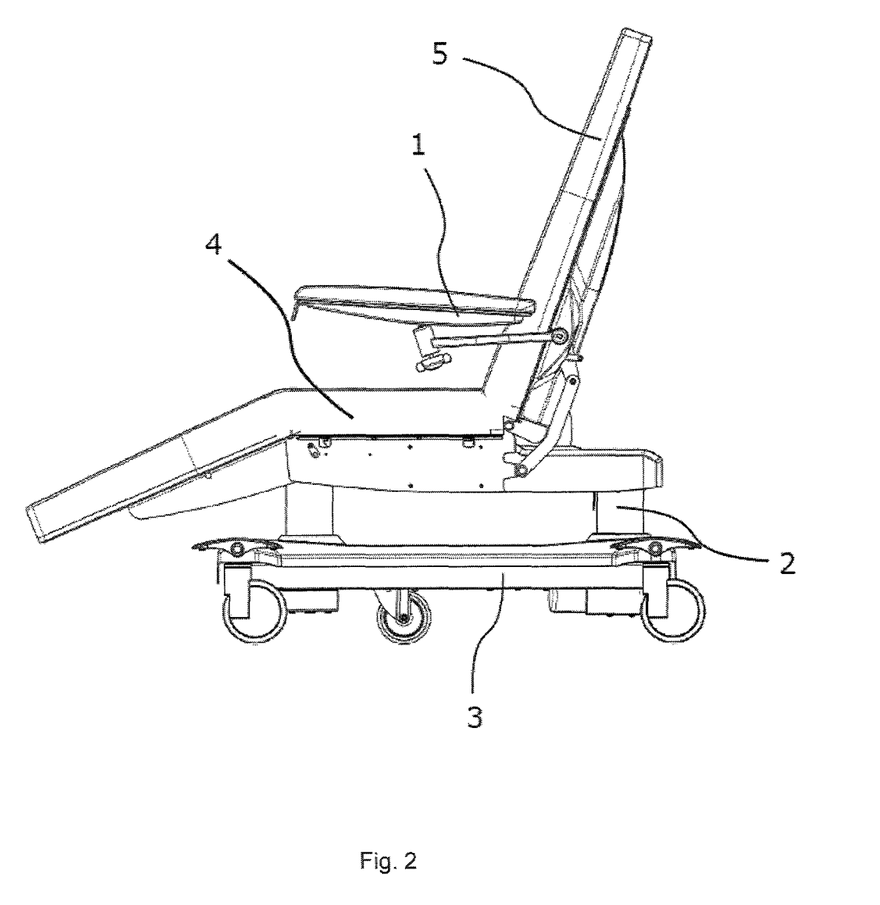
FIG. 2 shows schematically the chair with the armrest tilted without the latch inserted.
Figure 3:
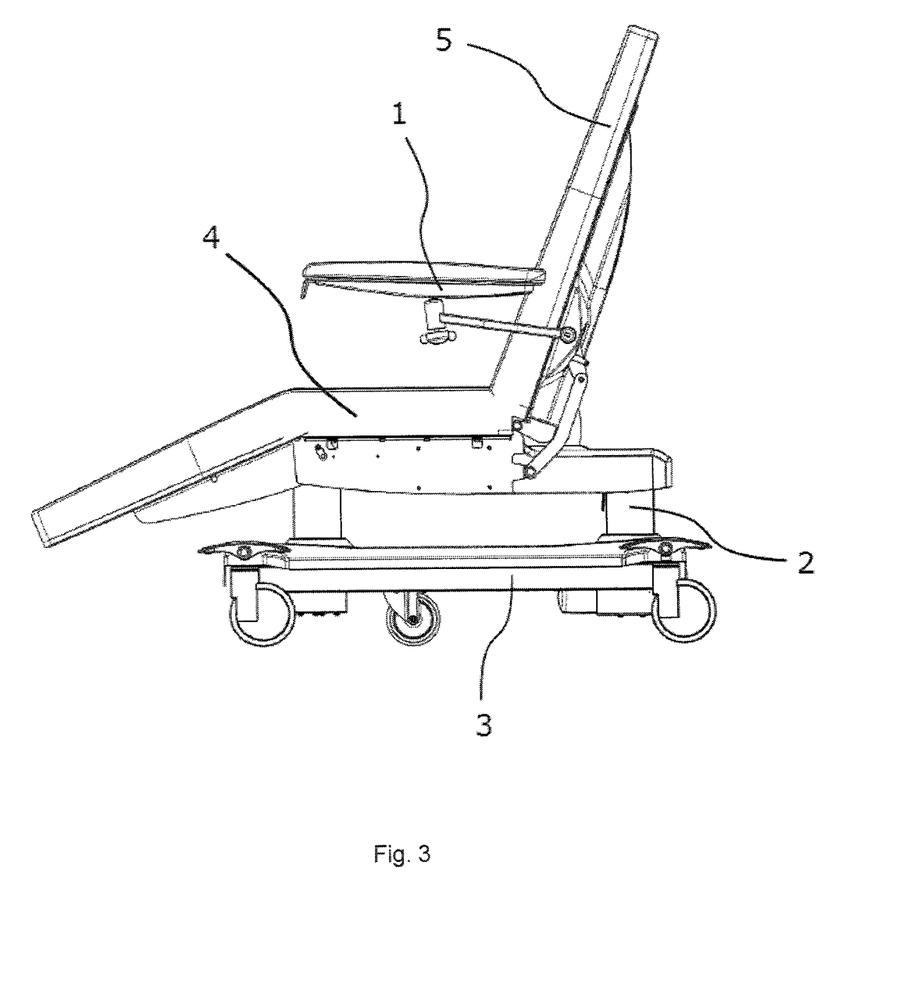
FIG. 3 shows schematically the chair with the armrest tilted with the latch inserted.
Figure 4:
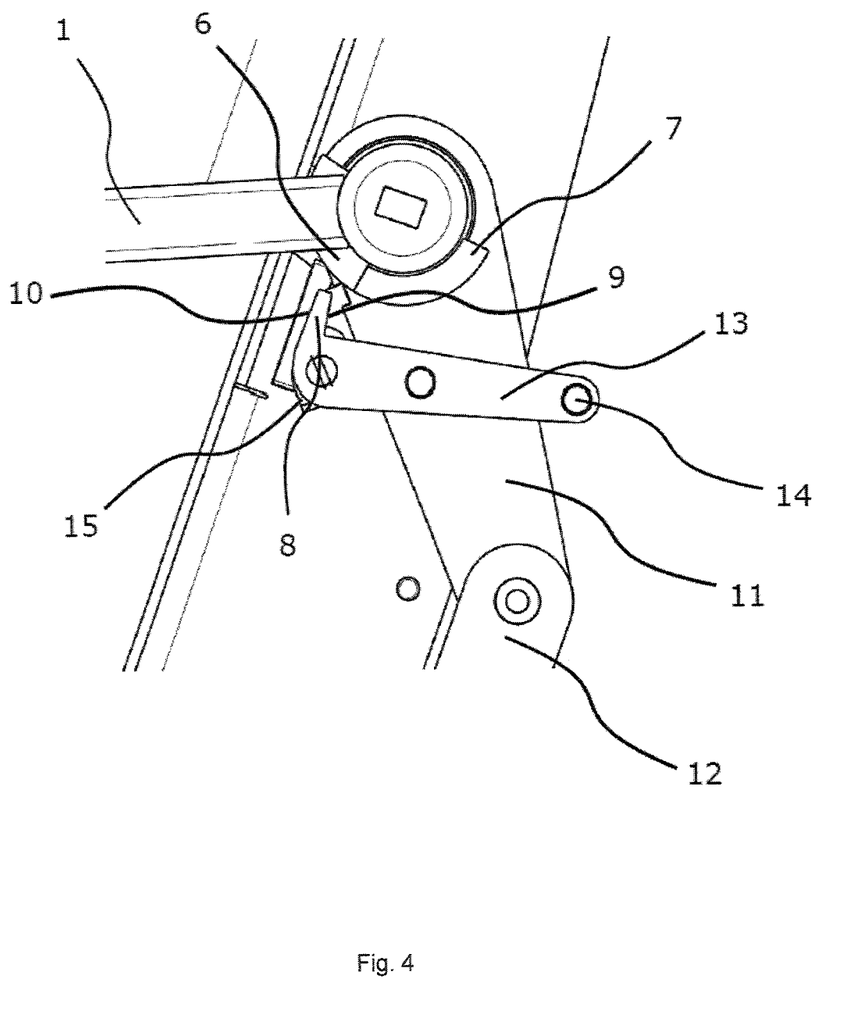
FIG. 4 shows a detail of the latch system without the latch inserted.

Medical chairs are used for many purposes, such as infusion application, one day surgery, and for different types of examination. FIG. 1 shows schematically the embodiment of a chair with an armrest 1 raised. The armrest 1 is an important part of the chair which supports upper limbs of a patient. In addition, the chair comprises a backrest part 5 with adjustable tilt, therefore the backrest part 5 is fixed to an upper side of a lifting mechanism 2 rotatably either directly, or via a frame or a sitting part 4. Height adjustment of the medical chair is done by the lifting mechanism 2, which is fixed to the base 3, which can comprise wheels for easier handling and may have a function of an undercarriage. The armrest 1 of the chair is fixed to the backrest part 5 rotatably and can be thus raised up into a functionless position or tilted down into a function position. The chair comprises a latch system by which the height of the armrest 1 can be adjusted in the function position. The latch system shown in FIG. 4 and FIG. 5 has a latch 8, which is put between a first stop 7 and an armrest stop 6 by which the armrest 1 position is raised as, after tilting the armrest 1 down, the armrest stop 6 touches down on a second stop 10, which is located on the latch 8. FIG. 2 shows the chair with the armrest 1 tilted down without the latch inserted. A detailed figure of the latch system is shown on FIG. 4. FIG. 3 shows the chair with the armrest 1 tilted down and with the latch inserted. A detailed figure of the latch system is shown on FIG. 5.

The backrest part 5 comprises a back stop, which the armrest stop 6 touches down onto if the armrest 1 is raised or lifted off into the non-functional position according to FIG. 1. The armrest stop 6 may be a part of the armrest 1 or may be in the form of a separate individual component, which is coupled to the armrest 1. The supporting part of the armrest 1, which is in contact with limbs of a patient, is coupled with the remaining part of the armrest 1 by a ball pivot, therefore the supporting part of the armrest is rotatory in all axes.

In the preferred embodiment, the chair comprises two armrests 1 and two latch systems. Each latch system thus controls height of one armrest.

Figure 5:
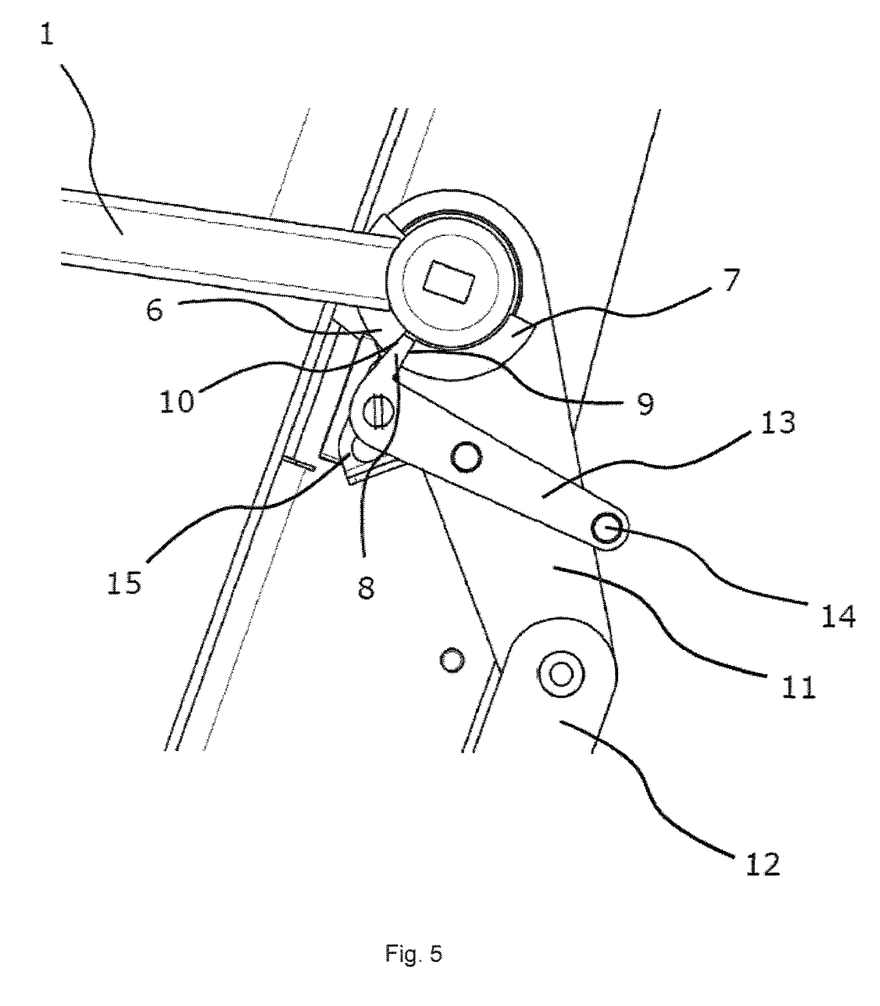
FIG. 5 shows a detail of the latch system with the latch inserted.

One example of an embodiment of the latch system is shown in FIG. 5. This embodiment comprises a latch system including a handle 13 with a handrail 14 by which the latch 8 is rotatably inserted between the first stop 7 and the armrest stop 6. The handrail 14 is shown in the FIG. 5 as a metal cylinder oriented out of the figure but it can be in the form of a wooden handrail or otherwise. The handle 13 is rotatably coupled to backrest part 5.

Another example of an embodiment of the latch system is an embodiment where the latch 8 is inserted between the first stop 7 and the armrest stop 6 translationally.

In another embodiment of the present invention, the latch system comprises a surface 15, which comprises a projection, and a handle 13 of the locking system, which comprises two hollows. The projection and the hollow have a locking function when the projection and the hollow make mechanical contact upon inserting the latch 8 between the first stop 7 and the armrest stop 7 or otherwise upon protrusion of the stop 7. The hollows and the projection are designed with an overlap and the handle 13 or surface 15 is flexible, therefore the hollow and the projection can make mechanical contact. In case of mechanical contact of the hollow and the projection, the projection enters into a space defined by the hollow and the position of the latch system is locked. Should the latch system be locked, it will be necessary to overcome a certain force to change the position. The latch system comprises two locking positions and the latch 8 is locked in the first position when the latch 8 is inserted between the first stop 7 and the armrest stop 6 and in the second position when the latch 8 is not inserted between the first stop 7 and the armrest stop 6.

Figure 6:
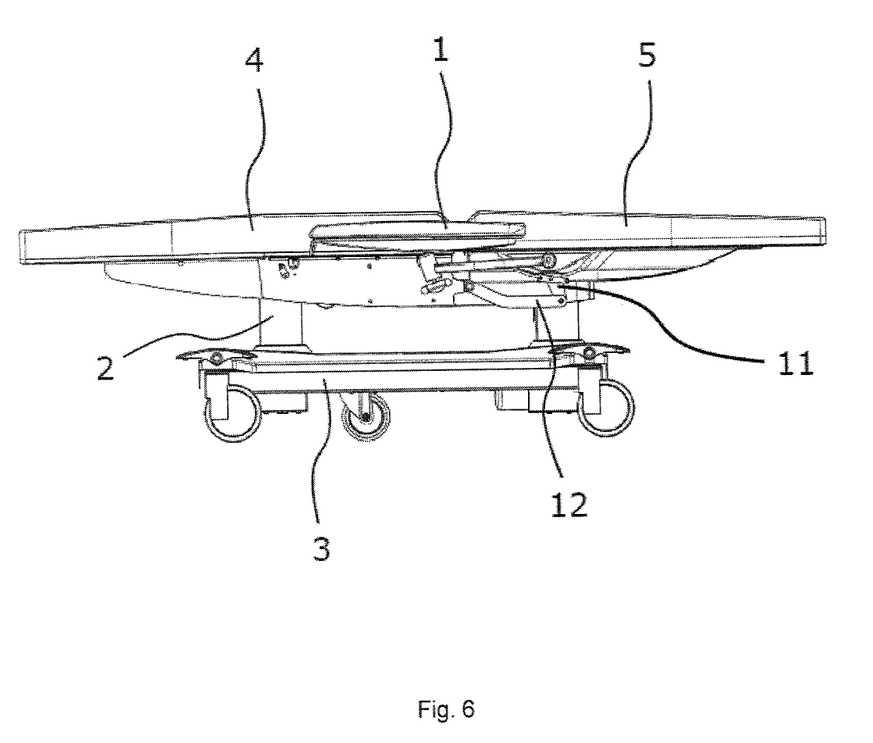
FIG. 6 shows schematically movement coupling the backrest part and armrest.

In another embodiment of the present invention, the chair comprises an arm 11, which is coupled rotatably to the armrest 1 on one side and via coupler 12 to the backrest part 5 and the first stop 7 on another side. The coupler 12 couples the arm 11 with the sitting part 4 or a frame or structure of the chair, which is coupled with the sitting part 4. This mechanism provides coupling of movement of the backrest part 5 and the armrests 1. Upon tilting of the backrest part 5 backward, the stops and the latch mechanisms rotate due to the coupling by which the armrests 1 can be tilted down. Conversely, upon tilting of the backrest part 5 upward the armrests 1 raise up.

The above-described height adjustment of an armrest may be utilized particularly in medical supports, such as chairs and beds, but also in means of transportation or relaxation chairs, lounges or deckchairs.

LIST OF REFERENCE SIGNS

1—armrest
2—lifting mechanism
3—base
4—sitting part
5—backrest part
6—armrest stop
7—first stop
8—latch
9—back surface
10—second stop
11—arm
12—coupler
13—handle
14—handrail
15—surface

The invention claimed is:

1. A medical chair with height adjustable armrest comprising:
   a lifting mechanism,
   a base coupled to a bottom side of the lifting mechanism,
   a sitting part coupled to an upper side of the lifting mechanism, and
   a backrest part coupled rotatably to the upper side of the lifting mechanism, and
   an armrest comprising:
      an armrest stop with the armrest rotatably coupled to the backrest part adjustable to an upper position and a bottom position, where, in the bottom position, the armrest stop bears on a first stop coupled to the backrest part, and in the upper position, the armrest stop does not bear on the first stop, and
   a latch system movably attached to the backrest part comprising:
      a latch with a back surface and a second stop, where the latch system is adjustable into a first position of the latch system and into a second position of the latch system, where in the first position of the latch system, the latch is located between the first stop and the armrest stop and in the second position of the latch system, the latch is not located between the first stop and the armrest, and where the upper position of the armrest is a position where the armrest stop bears on the second stop or any other position where the armrest is higher than in case when the armrest stop bears on the second stop.

2. The medical chair according to claim 1 wherein the latch in the first position of the latch system bears on the first stop by a back surface of the latch.

3. The medical chair according to claim 1 wherein the latch has a shape of wedge tapering toward a center of rotation of the armrest.

4. The medical chair according to claim 1 wherein the chair further comprises:
   an arm, and
   a coupler where the arm is attached to the first stop and the first stop and the arm are attached to the backrest part rotatably and where the coupler is fixed rotatably by a first end to the arm and fixed rotatably by a second end of the arm to the upper side of the lifting system.

5. The medical chair according to claim 1 wherein the latch system comprises a handle with a handrail and is attached rotatably to the backrest part.

6. The medical chair according to claim 1 wherein the latch system comprises:
   a surface comprising a projection, and
   a handle comprising a hollow, where, at least in one from the first position of the latch system and the second position of the latch system, the projection and the hollow fit together.

7. The medical chair according to claim 1 wherein the latch system comprises:
   a surface comprising a hollow, and
   a handle comprising a projection, where, at least in one from the first position of the latch system and the second position of the latch system, the hollow and the projection fit together.

* * * * *